US011139609B2

(12) United States Patent
Wolf

(10) Patent No.: US 11,139,609 B2
(45) Date of Patent: Oct. 5, 2021

(54) MODULAR CONNECTOR FOR CIRCUIT BOARDS

(71) Applicant: HARTING Electronics GmbH, Espelkamp (DE)

(72) Inventor: Torsten Wolf, Espelkamp (DE)

(73) Assignee: HARTING Electronics GmbH, Espelkamp (DE)

( * ) Notice: Subject to any disclaimer, the term of this patent is extended or adjusted under 35 U.S.C. 154(b) by 0 days.

(21) Appl. No.: 16/638,414

(22) PCT Filed: Aug. 9, 2018

(86) PCT No.: PCT/DE2018/100702
§ 371 (c)(1),
(2) Date: Feb. 11, 2020

(87) PCT Pub. No.: WO2019/037815
PCT Pub. Date: Feb. 28, 2019

(65) Prior Publication Data

US 2020/0176918 A1 Jun. 4, 2020

(30) Foreign Application Priority Data

Aug. 23, 2017 (DE) ..................... 10 2017 119 287.5

(51) Int. Cl.
*H01R 13/514* (2006.01)
*H01R 12/72* (2011.01)
(Continued)

(52) U.S. Cl.
CPC ......... *H01R 13/514* (2013.01); *H01R 12/724* (2013.01); *H01R 13/518* (2013.01); *H01R 9/26* (2013.01); *H01R 9/2608* (2013.01)

(58) Field of Classification Search
CPC .. H01R 12/724; H01R 13/514; H01R 13/518; H01R 9/26; H01R 9/2608
See application file for complete search history.

(56) References Cited

U.S. PATENT DOCUMENTS 4,425,018 A * 1/1984 Stenz .................. H01R 9/2408 439/716
6,261,124 B1 * 7/2001 Brock .................. H01R 13/514 439/540.1

(Continued)

FOREIGN PATENT DOCUMENTS

CN 102195206 A 9/2011
DE 199 54 501 A1 11/1999

(Continued)

OTHER PUBLICATIONS

International Preliminary Report on Patentability, dated Feb. 25, 2020, for International Application No. PCT/DE2018/100702, 6 pages.

(Continued)

*Primary Examiner* — Briggitte R. Hammond
(74) *Attorney, Agent, or Firm* — Seed IP Law Group LLP

(57) ABSTRACT

A plug connector, in particular a modular plug connector, is provided for mounting on a circuit board. The plug connector can be assembled from a plurality of plug connector modules, wherein each plug connector module comprises at least one part. The plug connector modules have an insertion side and a connection side, wherein the insertion side can either be installed on the circuit board or else it contacts a connection side of a mating connector module. The plug connector modules can be connected by at least one connector. This makes it possible also to install modular plug connectors on a printed circuit board.

8 Claims, 3 Drawing Sheets

(51) Int. Cl.
*H01R 13/518* (2006.01)
*H01R 9/26* (2006.01)

(56) References Cited

U.S. PATENT DOCUMENTS

| | | | | |
|---|---|---|---|---|
| 6,346,009 | B1 | 2/2002 | Lin | |
| 6,609,929 | B2 * | 8/2003 | Kamarauskas | H01R 13/514 439/541.5 |
| 7,717,757 | B2 * | 5/2010 | Yamada | B60R 16/0239 439/701 |
| 7,907,423 | B2 * | 3/2011 | Lopes | B60R 16/0238 361/822 |
| 8,206,164 | B2 * | 6/2012 | Sprenger | H01R 13/6275 439/153 |
| 8,947,859 | B2 * | 2/2015 | Froschmeier | B60R 16/0238 361/601 |
| 9,124,081 | B2 * | 9/2015 | Kowtun | H02G 3/16 |
| 9,407,019 | B2 * | 8/2016 | Falk | H01R 9/26 |
| 9,812,830 | B1 * | 11/2017 | Chuang | H01R 25/003 |
| 10,139,581 | B2 * | 11/2018 | Ishimine | H01R 13/514 |
| 10,746,940 | B2 * | 8/2020 | Hsu | G02B 6/3897 |
| 2003/0194914 | A1 | 10/2003 | Duck et al. | |
| 2016/0190720 | A1 | 6/2016 | Lindkamp et al. | |

FOREIGN PATENT DOCUMENTS

| | | | |
|---|---|---|---|
| DE | 10 2013 110 082 | A1 | 3/2015 |
| DE | 20 2015 105 742 | U1 | 11/2015 |
| EP | 1 353 412 | B1 | 5/2009 |
| FR | 2 971 371 | A1 | 8/2012 |
| GB | 2 256 542 | A | 12/1992 |

OTHER PUBLICATIONS

European Patent Office, International Search Report for international application No. PCT/DE2018/100702, dated Oct. 16, 2018, 6 pages (with English translation).
German Patent Office, Office Action for German application No. 10 2017 119 287.5, dated Nov. 10, 2017, 5 pages.
Chinese Office Action dated Oct. 9, 2020, for Chinese Application No. 201880054500, 6 pages.

* cited by examiner

MODULAR CONNECTOR FOR CIRCUIT BOARDS

BACKGROUND

Technical Field

The present disclosure relates to a modular plug connector for printed circuit boards. Plug connectors of this type are required to transmit power and/or data and/or signals. They are also intended for disconnecting and connecting cables.

More particularly, the present disclosure relates to plug connectors which are designed to form a connection to a circuit board or a so-called PCB ('printed circuit board'). These special connectors are needed to electrically conductively contact a conductor with a printed circuit board.

Description of the Related Art

Patent DE 10 2013 110 082 A1 discloses a plug connector for making an electrical connection between an electrical conductor and a printed circuit board. In this case the connector has an insulating body which has a plurality of cavities for receiving contact elements. Into a slot in an insertion side of the insulating body the circuit board can be plugged into the connector and contacted with first contact sides of the contact elements provided in the insertion side. Opposite the first contact side the contact elements have a second contact side, which is provided for insulation-piercing contacting of the electrical conductor. By the arrangement according to the invention of the contact elements in the insulating body a particularly space-saving set of dimensions of the connector can be implemented.

In DE 199 54 501 A1 is a shielded electrical multi-connection assembly, which consists of a conductive clip and at least two connectors. The connectors are held together by the clip. It is a prerequisite of the device that the clip fully encloses the connectors so that a surface mounting is possible.

Patent EP 1 353 412 B1 discloses a heavy duty connector with a modular design. In this device, in a fold-out retaining frame consisting of two halves, different interchangeable plug connector modules can be inserted. The fully populated retaining frame can in turn be inserted into a housing.

The disadvantage of the connectors known from the prior art, however, is that the printed circuit board connectors are permanently fixed in their design, that is to say, with regard to the location and application of the contacts.

BRIEF SUMMARY

Embodiments of the present invention provide a plug connector which can be used in a flexible way and can be produced at low cost and in a resource-efficient way.

According to an embodiment of the invention a plug connector is proposed, in particular a modular plug connector for mounting on a circuit board. The plug connector can be assembled from a plurality of plug connector modules, wherein each plug connector module comprises or consists of at least one housing. The plug connector modules have an insertion side and a connection side, wherein either the insertion side can be installed on the circuit board or else it contacts a connection side of a mating connector module. The connection side is used to connect an electrical conductor.

According to an embodiment of the invention, the plug connector modules can be connected to each other by way of at least one connector.

Plug connectors are sufficiently well known in the prior art. They are available in different designs, from heavy duty connectors for the railway industry or mechanical engineering up to the delicate connectors used for mounting on printed circuit boards.

The known connectors each have an insertion side and a connection side. In these, the insertion side and the connection side are preferably arranged opposite each other. The connection side of the plug connector is used to connect the different conductor types. In this case, these are electrical conductors for the transmission of power and/or signals and/or data. In the prior art, the connection sides can also be equipped with pneumatic and/or hydraulic and/or optical conductors.

The insertion side is provided for connecting and contacting the plug connector either to an insertion side of a mating connector or for connecting the plug connector to a printed circuit board. If the plug connector is to be connected to a mating connector, the insertion side is designed either with female (socket) contacts or with male (pin) contacts. If the connector is designed to be connected to a printed circuit board instead, then the insertion side is fitted with through-hole contacts or surface mounted contacts instead of socket or pin contacts. Through-hole contacts are also referred to in the prior art as THR (through-hole reflow) contacts or THD contacts. The contacts for surface mounting are also known as SMT/SMD contacts (surface mount device contact).

The plug connector underlying embodiments of this invention is a modular-type connector. In other words, the connector is composed of a plurality of plug connector modules of the same or different types. These consist of a module housing into which a desired contact element can be inserted. The type of the contact elements is based on the field of application of the plug connector module or the plug connector.

In heavy duty connectors a so-called retaining frame secures and fixes the position of the individual plug connector modules. For reasons of space, however, this solution is not transferable one-to-one to a printed circuit board. In addition, in contrast to heavy duty plug connectors, printed circuit board connectors were not originally intended for individual assembly.

However, there has been a need among customers for a long time to individualize such connectors. This is because the arrangement of the necessary contact elements on the printed circuit board is in most cases dependent on the type of application and the wishes of the customer.

However, to ensure the stability of the entire connector and the accompanying ease of installation, the plug connector according to embodiments of the invention has the facility to reliably connect the individual connector modules, which the customer has assembled individually according to their needs, using a connector.

The connector ensures that the individual plug connector modules, once connected to the connector, are permanently fixed in their arrangement and position. This allows an engineer to assemble the connector on the printed circuit board more easily than if they had to assemble all connector modules individually. However, the connector is designed so that if necessary, it can be removed manually or using a piece of equipment, i.e., a tool, in order to replace plug connector modules and/or to change their order.

In a particularly advantageous embodiment of the invention the connector can be mounted directly on the plug connector module. As a result, the stability factor between the connector and at least two plug connector modules is even further increased. For the assembly, the plug connector module and the connector each have shapes or regions or devices, which can be connected to each other in an assembly procedure known from the prior art.

In an advantageous design the connector comprises or consists of a sturdy material, in particular plastic or metal. The stable material ensures an increased durability is achieved. Ideally, the material used is also slightly flexible and has a good elastic deformation within the context of a stress-strain diagram. This combination of stability and flexibility additionally guarantees the re-usability of the connector for repeated assembly and disassembly operations. This design is also therefore resource-efficient and cost-effective in the long term.

The connector advantageously comprises a length which is longer than the length of a plug-connector module. If the connector is longer than the plug connector module, a connector can already produce a secure connection between two plug connector modules. If a connector were exactly as long as a plug connector module and a whole-surface connection were created, no such connection between two plug connector modules can be guaranteed for producing a modular connector. Therefore, the design of the connector to be longer than the plug connector module is advantageous.

A particularly advantageous design is provided if the plug connector module has a guide, in particular a so-called dovetail guide, and the connector has a corresponding first recess that matches it.

A dovetail guide, or dovetail joint as it is also called, is a connection similar to a tongue and groove joint, in which the shape of the tongue (also: tine or spigot) remotely resembles the forked shape of the tail of a swallow. In contrast to a tongue and groove joint the dovetail guide has a higher degree of positive fit, not only at right angles to the dovetail but also in its longitudinal direction. It can absorb stresses in any direction and prevent tilting or lifting of the body, here the connector. The advantages of the dovetail guide are further enhanced by the low assembled height of the connector on account of the dovetail guide, because no extra space has to be created for the connector.

In a particularly advantageous design, the plug connector module has two guides, in particular two dovetail guides, wherein in each case one dovetail guide is arranged on a first side and one dovetail guide on a second side opposite the first side.

The first side of the connector module can be, for example, the top, which after mounting is arranged on the side facing away from the printed circuit board. Accordingly, the second side can be the underside, which is located close to the circuit board after assembly. Of course, an inverse arrangement or an arrangement of the dovetail guides on the insertion side and on the connection side is also conceivable.

A plug connector module comprising at least two parts that can be locked together is advantageous. The reason for this is that the design as a two-part plug connector module simplifies the tasks of mounting on the circuit board and placement of contact elements for the engineer. The engineer can thus insert the contact elements both from the insertion side and from the connection side. Furthermore, the placement of contact elements on the housing, which is not fastened to the printed circuit board, is also possible retrospectively.

For this purpose the plug connector module has at least one locking device or means. This locking device or means is designed to ensure the secure connection between the two parts of the connector module. To do so, it is designed in such a way that one part of the connector module has at least one latch and the other part has at least one locking recess, which can be locked together. The latch can also be a long attachment and the locking recess a long groove.

In an advantageous design, the plug connector module has at least one fixing device or means. The at least one fixing device or means is designed to ensure the connection between the plug connector module or plug connector and the printed circuit board.

In a particularly advantageous design the fixing device or means is configured for being locked and/or soldered and/or screwed onto a perforated surface, such as a perforated strip, in particular a metal strip or a printed circuit board. By the use of the fixing device or means the plug connector or plug connector module and the printed circuit board are connected to each other in a fixed, stable and secure manner. The fixing device or means can be elongated ends of the contact elements of the SMD contacts or the THR contacts, or else screws or similar items which are suitable for mounting. In addition a combination of various fixing devices or means is also conceivable in order to maximize the reliability of the connection to the circuit board.

So that the plug connector modules are able to receive contact elements of any type at all, the plug connector modules advantageously have at least one second recess for receiving contact elements. This recess is shaped in such a way that the contact elements are received therein securely and in a standard-compliant way.

In an advantageous design the plug connector module, in combination with at least one corresponding contact element which is received in a second recess, is suitable for the transmission of power and/or signals and/or data. In a connector module, depending on the design, either one contact element or a plurality of contact elements can be used. In addition, plug connector modules are also conceivable which enable a pure guidance, protection and fixing function of the other plug connector modules. These connector modules are then also installed in the plug connector at regular intervals as required and used to provide additional fixation of the plug connector on the circuit board, in order to advantageously reduce the forces acting.

BRIEF DESCRIPTION OF THE SEVERAL VIEWS OF THE DRAWINGS

An exemplary embodiment of the invention is shown in the drawings and will be explained in more detail in the following. Shown are.

The figures in some cases contain simplified, schematic representations. In part, for the same but possibly not identical elements, identical reference numerals are used. Different views of the same elements might be shown to different scales.

DETAILED DESCRIPTION

Figure 1:
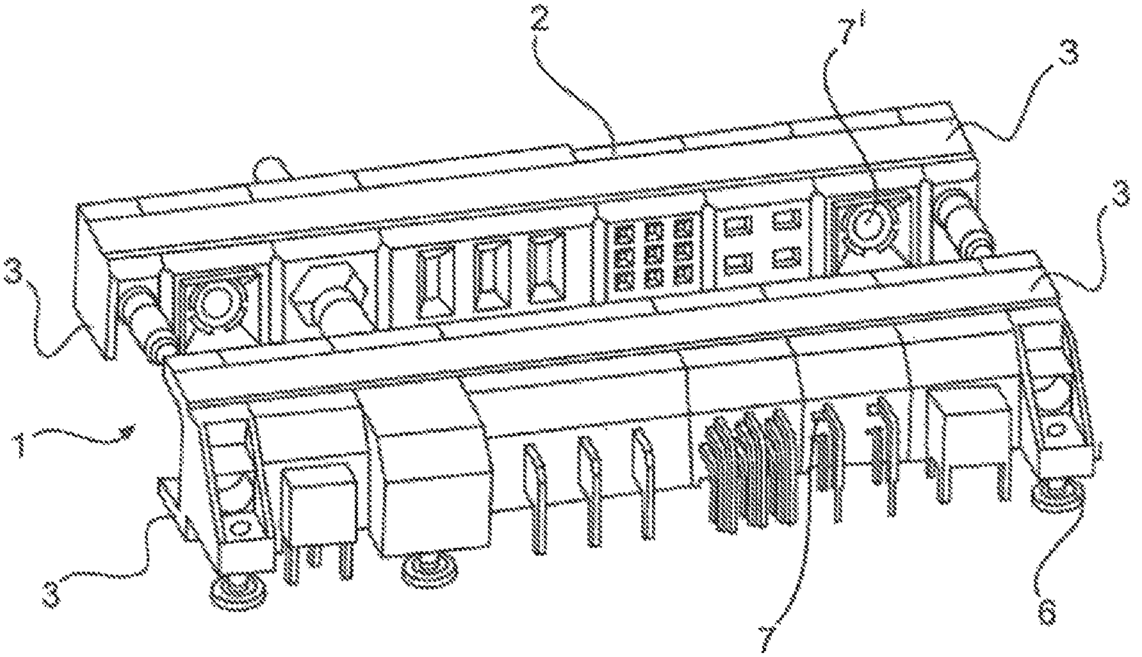
FIG. 1 a perspective drawing of a modular plug connector for a printed circuit board, FIG. 2 a perspective drawing of a plug connector module, FIG. 3 a perspective drawing of another plug connector module, FIG. 4 a perspective drawing of a connector, FIG. 5 a perspective drawing of a modular mating connector and FIG. 6 a perspective detail of the mating connector.

FIG. 1 shows a perspective drawing of a modular plug connector 1 according to an embodiment of the invention for plugging onto a circuit board, which includes connector modules 2. In this case, the plug connector modules 2, which are each designed in two parts, are shown separated into their two halves. For use of the connector 1, the two housings of the connector modules 2 must be plugged into each other and locked together.

Each of the two halves of the connector 1 of the illustrated embodiment consists of eight individual connector modules 2. The connector modules 2, for the sake of clarity only one of which is labeled with a reference symbol in FIG. 1, include five connector modules 2 for transmitting power, data and signals and three connector modules 2 for secure contacting.

The connector modules 2 each have a first side (top side) and a second side (underside) opposite the first side. The underside is the side of the connector module 2 which is closest to a circuit board after assembly. The top side is therefore the side opposite the underside and therefore the side farthest away from the printed circuit board.

Each connector module 2 has at least one second recess 7. This second recess 7 is used for receiving at least one contact element. The nature of the second recess 7 is oriented towards the area of application of the connector module 2. Of these, there are connector modules 2 for the transmission of power and/or signals and/or data. The area of application is defined by the contact elements used. For example, in FIG. 1 different connector modules 2 with different second recesses 7, 7' are shown, wherein for the sake of clarity only a second recess 7 or 7' is labeled.

The eight connector modules 2 are fixedly connected to each other by way of two connectors 3. One connector 3 is arranged on the top side of the connector modules 2. The second connector 3 is arranged on the underside. The two connectors 3 are fixedly locked to the connector modules 2. For this, the connector modules 2 have appropriate guides 4, which are shown more clearly in FIGS. 2 and 3. The connectors 3 each have a first recess 5, shown in FIG. 4, which represents a negative version of the guides 4. The connectors 3 thus fit flush into the connector modules 2 and connect them securely to each other.

The guides 4 are so-called dovetail guides, which in their contour resemble a dovetail in the broadest sense. This design for the guides 4 guarantees a high degree of stability and, at the same time, secure locking.

In order also to ensure an equally secure connection to the circuit board to that provided between the individual connector modules 2 by the connector 3, individual connector modules 2 are each equipped with a fixing device or means 6. In FIG. 1, for example, three connector modules 2 are shown, each with one fixing device or means 6. The fixing device or means 6 in this embodiment are screws. Alternatively, bolts or other devices or means for secure fixing are conceivable.

In addition to the fixing device or means 6, the entire plug connector 1 is also fixed via the contact elements received in the second recesses 7. This is carried out, for example, via the soldered joint or else via a screw fitting.

Figure 2:
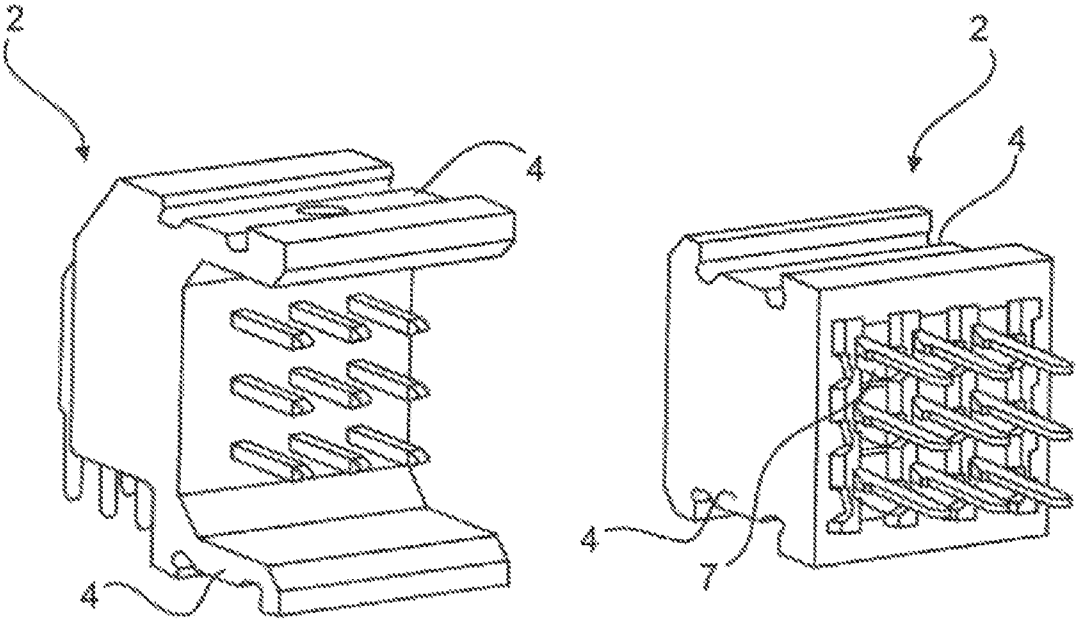

FIG. 2 shows a single connector module 2. This connector module 2 is a connector module which has a guide 4 on its top side. A guide 4 is also located on the underside.

FIG. 2 shows clearly the two-part design of a connector module 2, and hence the increased convenience for the engineer when fitting the second recess 7 with the contact elements, since this is now accessible from two sides.

The connector module 2 shown has nine second recesses 7 for each half of the connector module 2. One contact element is inserted into each second recess 7. The two housings differ in terms of the contact elements inserted, which depending on the housing are either inserted as male or female variants. The two sides, which are joined together, are designed as a male side and a female side. The side which is used for mounting on the circuit board in this example has angled contact elements in order to ensure a secure connection. On the other hand, the side which can be connected to a mating connector or a mating connector module or else to a printed circuit board is here designed to be linear and aligned with the male side of the connector module. Even a right-angled arrangement of printed circuit boards is possible.

Figure 3:
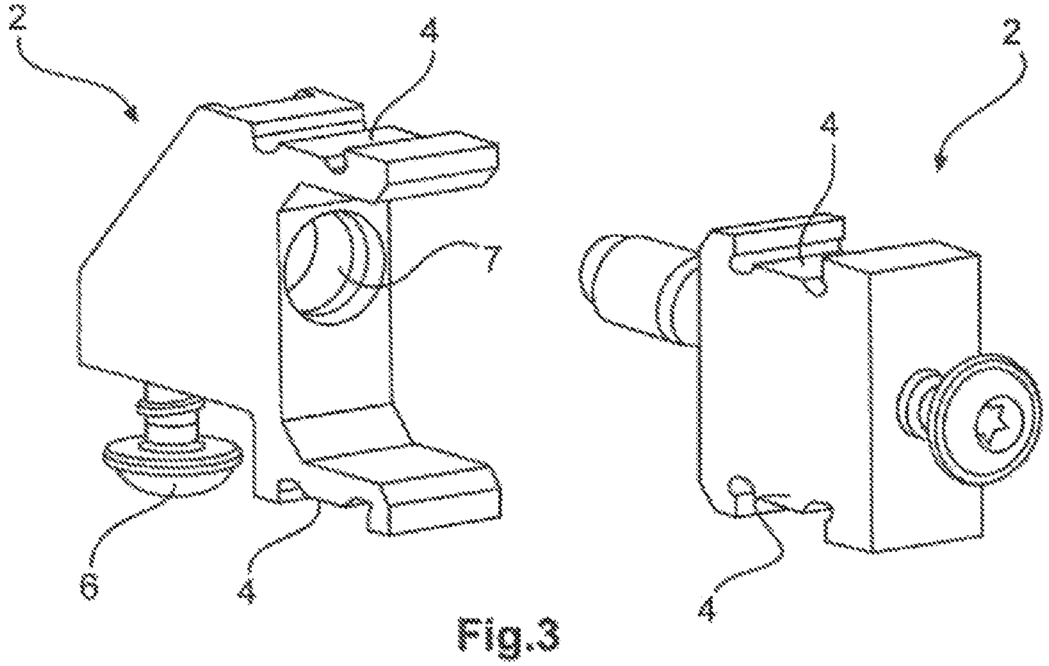

A connector module 2, which is used only for the secure fixing of the entire plug connector 1 on the printed circuit board, is shown in FIG. 3. This connector module 2 also has one guide 4 on the top and one on the underside. This connector module 2 also has a two-part design.

However, it differs from the connector module 2 of FIG. 2 in that while a male/female connection is also present in the junction region between the two halves of the connector module 2, this is in fact formed by a bolt and a second recess 7. In FIG. 2 the male/female connection comprises or consists of the received contact elements, or more precisely their male sides, and the second recesses 7 as sockets. The connector module 2 shown in FIG. 3 cannot be used to transmit power or signals or data, since it is only used for the guidance and fixing of the entire plug connector 1. Therefore, ideally at least one such connector module 2 is integrated into the plug connector 1 or, as shown in FIG. 1, more than one. The use of a plurality of such fixing connector modules 2 prevents any twisting or warping of the plug connector 1 on the printed circuit board.

Figure 4:
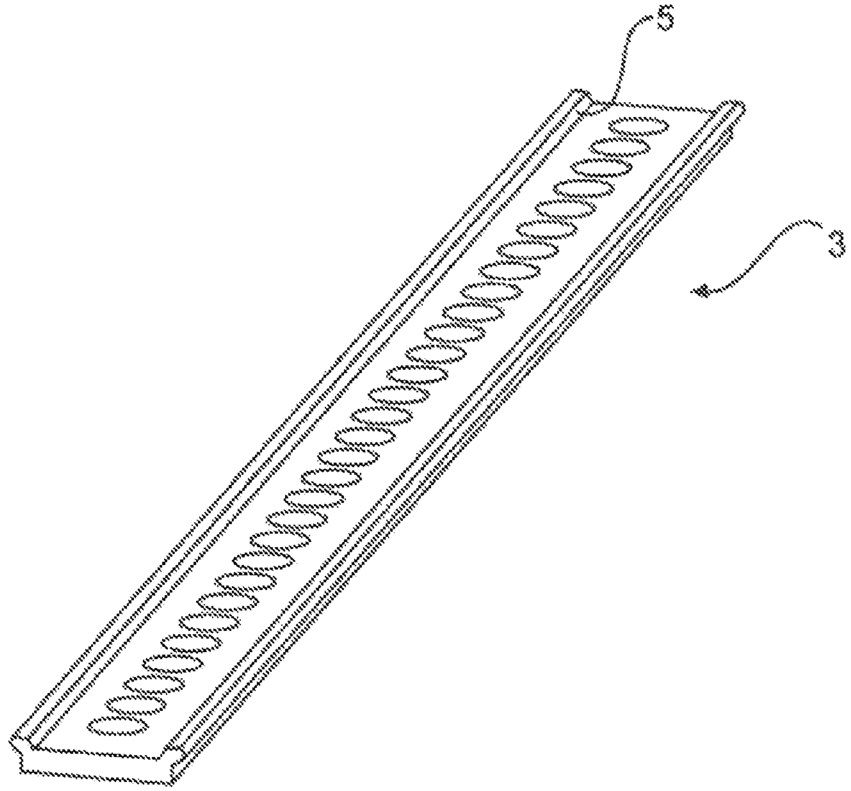

FIG. 4 shows a single connector 3. The connector 3 comprises or consists of a sturdy material, plastic or metal. Due to the first recess 5 the elongated body of the connector has the negative shape of the guide 4 of the connector module 2. In this exemplary embodiment the guide 4 is a dovetail guide. Thus, the first recess 5 is the corresponding mating contour thereto. The guide 4 and thus also the connector module 2 can thus be securely locked together in a stable and durable manner.

The connector 3 is designed with a longer length than a connector module 2. The basic shape of the connector 3 is rectangular, the long side of the rectangle being at least twice as long as the short side. The connector 3 of FIG. 4, for example, has a length ratio of 1:5, wherein other length combinations are also conceivable.

Figure 5:
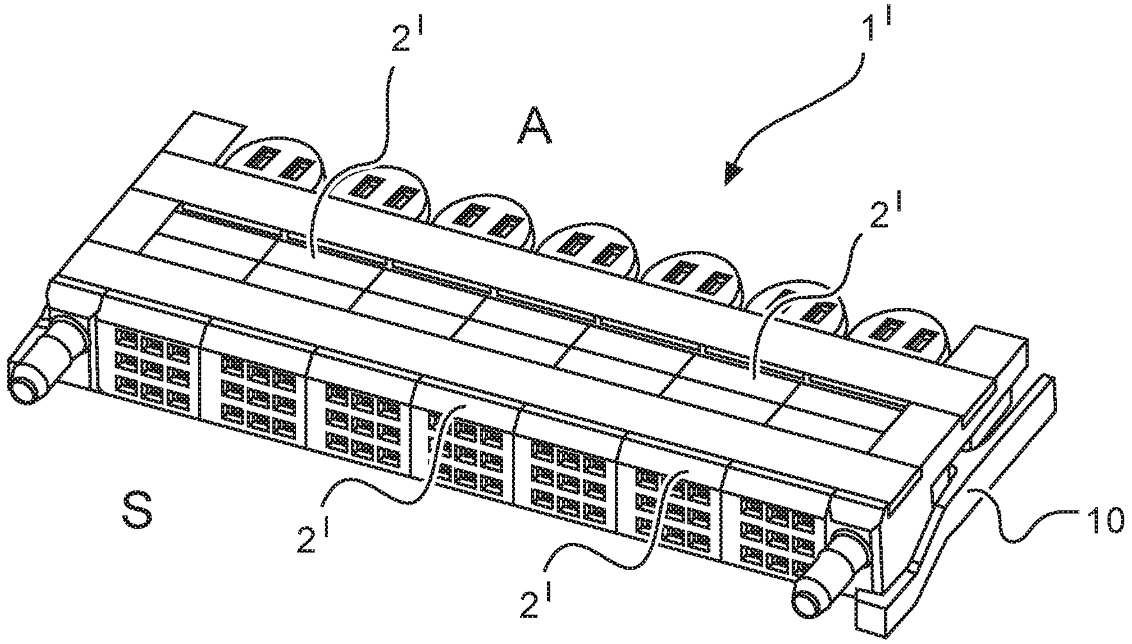
Figure 6:
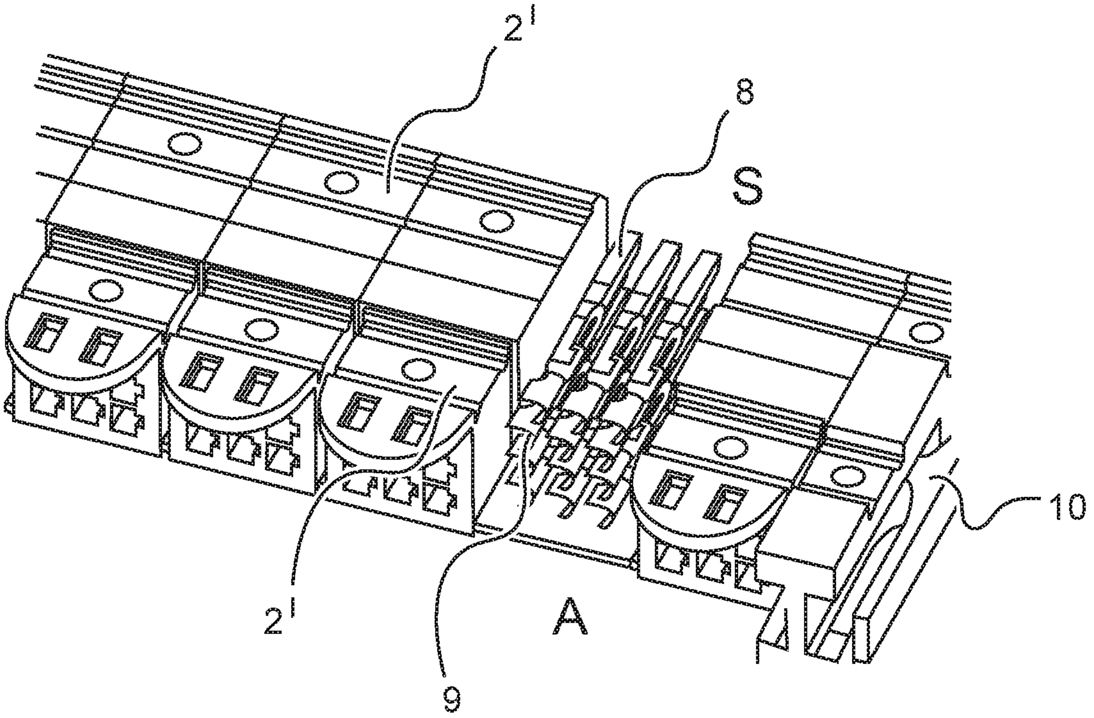

In FIGS. 5 and 6 a modular mating connector 1' is shown which can be plugged into the modular plug connector 1, which is mounted on a printed circuit board, for example. The structure of the mating connector 1' can be implemented in principle similarly to the plug connector 1. The mating connector 1' also has a modular design and is composed of individual connector modules 2', which have a two-part design and can be connected to each other via a connector.

The mating connector 1' has an insertion side S and a connection side A. In FIG. 6 a connector module 2' of the mating connector 1' is shown without a module housing. The contact elements 8 contained therein can be seen. In the direction of the insertion side S the contact elements 8 are each designed as compressed fins, which when plugged into a plug connector 1 surround a contact pin 8'.

On the connection side A the contact elements 8 have a crimp connection area 9. To this crimp connection area, individual conductors of a connected cable (not shown) can be connected in a known manner. A cable (not shown) is connected to the mating connector 1'. The mating connector

1' can be plugged into the plug connector 1 that is plugged onto the printed circuit board, so that the signals or currents from the cable are transmitted to the printed circuit board.

To fix the mating connector 1' to the plug connector 1, the mating connector 1' has a locking element 10 on both of its narrow sides, which on the insertion side S is fitted with a hook, which engages in a designated undercut (not shown) of the plug connector 1 to provide a reversible locking.

Even if the figures show various aspects or features of the invention in combination, it will be evident to the person skilled in the art—unless otherwise stated—that the combinations illustrated and discussed are not the only possible ones. In particular, corresponding units or feature complexes from different exemplary embodiments are mutually interchangeable.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A modular plug connector for mounting on a printed circuit board, the modular plug connector comprising:

a plurality of individual plug connector modules, at least one of the plurality of individual plug connector modules including a fixing device on an underside thereof to secure the modular plug connector to the printed circuit board; and at least one elongated module connector, wherein the plug connector modules are configured to be locked together in a linear arrangement by the at least one elongated module connector such that adjacent plug connector modules are prevented from rotating or translating about a transverse plane relative to each other;

each plug connector module has a protruding guide for interfacing with the elongated module connector, the protruding guides being arranged end to end to form an elongated linear guide element when the plug connector modules are locked together in the linear arrangement; and the elongated module connector has a guide recess correspondingly shaped to the protruding guide of each plug connector module to insertably receive the elongated linear guide element.

2. The modular plug connector as claimed in claim 1, wherein the at least one elongated module connector is configured to be mounted on each plug connector module.

3. The modular plug connector as claimed in claim 1, wherein the at least one elongated module connector is made from a stable material.

4. The modular plug connector as claimed in claim 1, wherein the at least one elongated module connector has a length which is longer than a length of each plug connector module.

5. The modular plug connector as claimed in claim 1, wherein each plug connector module has two guides, wherein one guide is arranged on a first side and one guide is arranged on a second side opposite the first side.

6. The modular plug connector as claimed in claim 1, wherein the fixing device is suitable for locking and/or screwing and/or soldering onto a perforated surface of the printed circuit board.

7. The modular plug connector as claimed in claim 1, wherein at least one of the plug connector modules has at least one contact element recess for receiving a contact element.

8. The modular plug connector as claimed in claim 7, wherein with at least one contact element received in the contact element recess, the plug connector module is suitable for the transmission of power and/or signals and/or data.

* * * * *